Figure 1:
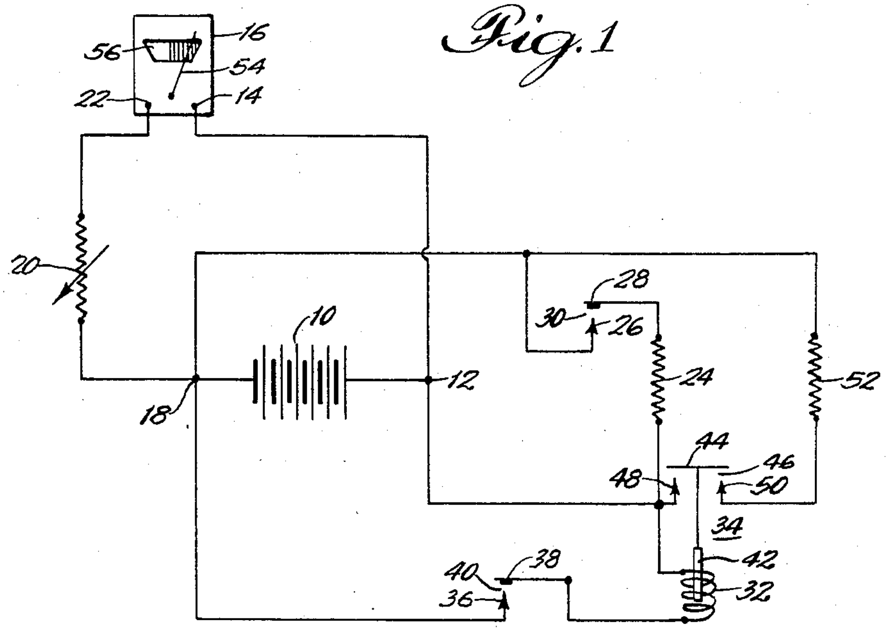

Aug. 30, 1960 K. DAWKINS 2,951,199

BATTERY TESTING

Filed Aug. 12, 1957

INVENTOR:
Kenneth Dawkins,
BY Baird, Freeman & Molinare
ATTORNEYS.

United States Patent Office 2,951,199
Patented Aug. 30, 1960

2,951,199

BATTERY TESTING

Kenneth Dawkins, Minneapolis, Minn., assignor to Franklin Manufacturing Company, a corporation of Minnesota Filed Aug. 12, 1957, Ser. No. 677,601

5 Claims. (Cl. 324—29.5)

This invention relates to measuring and testing apparatus, and more particularly to a new and improved method and means for measuring and testing of batteries.

The establishment of the condition of a battery, such as a storage battery of the type utilized in automobiles, is not difficult when ample time is available and when laboratory equipment with qualified operators are provided. However, it is known by those skilled in the art, that generally neither experienced personnel nor equipment of the type required is available at the average automobile service station, and consequently, the testing of automobile storage batteries utilizing present day techniques has not proved entirely satisfactory.

In view of this problem, many types of battery testing devices for use at automobile service stations have been devised. Some of these devices test the total battery voltage on open circuit and others compare cell voltage on open circuit. Other devices test total voltage or compare cell voltage under load, but generally, all of these prior art devices, unless laboratory-type procedures and equipment can be considered for automobile service station use, are unsatisfactory in their operation, thus rendering the test involved either impractical or unreliable.

The problems described above, and particularly when cell comparison tests are made, are becoming increasingly acute with the growing use of batteries having bituminous compound covered intra-cell connectors, and with the contemplated use, by some manufactures, of solid, one-piece top covers which would totally enclose all intra-cell connectors and thus make cell comparison tests impossible.

Accordingly, it is a general object of this invention to provide new and improved apparatus for the measuring and testing of batteries.

More particularly, it is an object of this invention to provide an improved method and means for detecting a defective cell or cells in a battery by measuring total battery voltage.

It is another object of this invention to provide improved battery testing apparatus which eliminates the need for making adjustments for battery size or temperature.

It is still another object of this invention to provide improved battery testing apparatus which eliminates the need for making adjustments for the number of square inches of plate surface exposed to the electrolyte or for the fully charged specific gravity of the electrolyte.

It is a further object of this invention to provide a novel method for testing batteries which advantageously is adapted for use by relatively unexperienced personnel.

It is a still further object of this invention to provide a new and improved method and means for testing batteries which are characterized by their relative simplicity, speed and economy of use.

Figure 2:
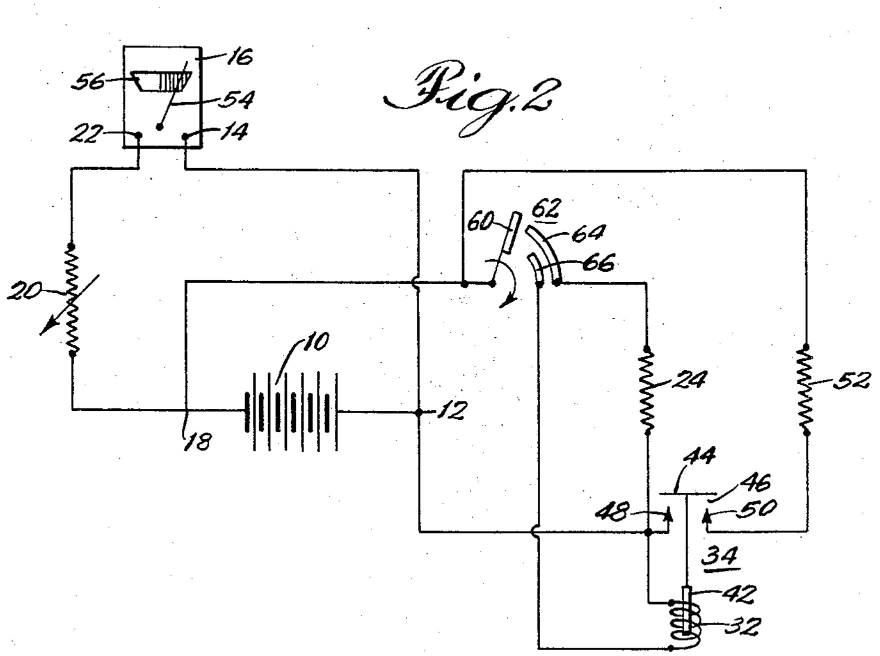

With these and other objects in view, the invention resides in the construction, arrangement and combination of the various parts of the novel battery testing circuit, and in the steps of the method of testing the batteries, whereby he objects contemplated are attained as hereinafter more fully set forth, pointed out in the clatms and illustrated in the accompanying drawing wherein:

Figure 1 is a schematic diagram of one illustrative battery testing circuit embodying the invention; and Fig. 2 is a schematic diagram of an alternative embodiment of a battery testing circuit in accordance with the invention.

Referring now to the drawing, and more particularly to the circuit embodiment of Figure 1, there is shown a battery 10, which advantageously may be of the type used in automobiles, that is to be tested for detecting any defective cell or cells therein. One terminal 12 of battery 10 is connected to a terminal 14 of voltmeter 16 and the other terminal 18 of battery 10 is connected through a variable resistance 20 to the other terminal 22 of the voltmeter 16.

A first resistance load 24 is connected in series with the contacts 26 and 28 of a normally open switch 30 across the terminals 12 and 18 of battery 10. In addition, the winding 32 of a solenoid relay 34 is connected in series with the contacts 36 and 38 of a normally open switch 40 across the terminals 12 and 18 of battery 10. The armature 42 of the solenoid relay 34 is coupled to the switch contact 44 of a normally open switch 46, and contacts 48 and 50 of switch 46 are connected in series with a resistance load 52 across the terminals 12 and 18 of battery 10.

In the operation of the circuit shown in Figure 1, the first load represented by the resistance 24 is connected across battery 10 by the closing of the normally open switch 30. The value of load resistance 24 is selected so that its connection across battery 10 serves to depress the battery voltage sufficiently so as to be observable on the voltmeter 16. Advantageously, load resistance 24 may be given a value so that lowering of the battery voltage will be equal to about .06 volt per cell, on a good, fully charged battery at 70° F.

The potentiometer 20 connected in series with the voltmeter 16 then is adjusted so that the voltmeter pointer 54 is positioned at a desired point on the voltmeter scale 56. Advantageously, the point to which the pointer 54 is adjusted by the variable potentiometer 20 may be near or at the extreme right or left hand positions of the voltmeter 56.

It should be noted however, that the adjustment point may not be lower than the calibrated allowable drop. Thus, if the allowable drop is 1 volt in 12 volts, the adjustment point must be at least 1 volt above the zero or stop point on the meter.

It further should be noted that advantageously the resistance value of the potentiometer 20 should be such that the meter cannot be adjusted to the adjustment point if one or more cells of the battery are completely dead. Thus, when the invention is used for testing 12 volt automobile batteries, for example, the potentiometer is given a variable resistance value which precludes adjustment under 11 volts, thereby making it impossible to adjust the meter pointer if one or more cells are completely dead.

The normally open switch 40 then is closed so that its contacts 36 and 38 complete the circuit to enable the solenoid winding 32 to be energized from the battery 10. Energization of winding 32 causes the solenoid relay armature 42 to place contact 44 of switch 46 into electrical contact with the switch contacts 48 and 50 to the end that the resistance load 52 is connected across the battery 10 in parallel with the resistance load 24.

Advantageously, the load resistance 52 has a resistance value a predetermined amount lower than the first resistance load 24 so that the total current drawn from the battery 10 is increased.

It will be appreciated by those skilled in the art that after the voltmeter pointer 54 has been adjusted to a desired position, the connection of a resistance load of known value across the battery 10 will cause the battery voltage to drop no more than a determinable amount, provided the battery is sufficiently charged to deliver the required amount of current and has no defective cell or cells. This fixed amount of voltage drop for the battery 10 can be marked on the dial 56 of the voltmeter and thus, it can be fully understood that any battery which drops more than this pre-set value is either so discharged as to be unable to support this second resistance load, or is defective. The procedure then, in accordance with the invention, is to recharge the battery 10 and repeat the test. If the negative results first obtained are repeated, then the battery under test may be considered defective.

Now it can be seen that this relatively simple method for determining the condition of a battery is highly advantageous in that the temperature, battery size, plate size, and the nominally fully charged specific gravity of the battery all are automatically taken into account when the voltmeter is adjusted after the first resistance load is connected across the battery. After this initial adjustment of the voltmeter, the addition of the second resistance load serves to compare battery performance at the same temperature and with all battery conditions being equivalent with the exception that the rate of discharge of the battery has been increased. Since the increase in load on a battery in this condition will cause a predeterminable drop in voltage when all factors such as battery temperature and battery size have been taken into account, the presence of a defective cell or cells in the battery may be readily detected. Those skilled in the art will readily appreciate that the feature of two comparative voltage readings at definite intervals and under similar conditions makes possible the many important advantages provided for the first time by the invention. Manifestly, if desired, a single load may be used with the battery under test and two comparative readings may be made thereon at definite time intervals to produce the same result.

In accordance with another embodiment of this invention, the novel method for testing a battery, as described above, may be achieved more automatically by the circuit shown in Figure 2 of the drawing, wherein components similar to the components in the circuit of Figure 1 have been given like numerals. Thus, in Figure 2, the battery 10 to be tested is connected at terminal 18 to variable resistance 20 and to the wiper 60 of a time delay switch 62. Terminal 18 of the battery 10 additionally is connected to a terminal of the load resistance 52, the other terminal of which is adapted to be connected through the contacts 44, 48 and 50 of the solenoid relay switch 46 to terminal 12 of battery 10. Variable resistance 20 is connected to terminal 22 of voltmeter 16, the terminal 14 of which is connected to the battery terminal 12. The time delay switch 62 is provided with a first arcuate contact 64 which is connected to the first load resistance 24, and with a second and shorter length arcuate contact 66 connected through the solenoid relay winding 32 to the battery terminal 12.

In this embodiment of the invention, time delay switch 62 advantageously may be operated by any suitable synchronous or hydraulic mechanism such that the wiper contact 60 is placed in contact with the arcuate contact 64 and then the arcuate contact 66 in accordance with a controlled time sequence. For example, the switching sequence may be effected by suitable mechanical, electrical or hydraulic motor apparatus, or, if desired, by temperature responsive devices of the type employing thermally sensitive bimetal elements.

As in the embodiment of Figure 1, the dial of voltmeter 16 is marked in the allowable voltage drop from the adjusted point of the first resistance load 24, and the variable resistance 20 is adjusted to position the voltmeter pointer at the starting point of this allowable voltage drop.

In the operation of the embodiment of Figure 2, the switch wiper contact 60 engages the arcuate contact 64 to place the load resistance 24 across the battery 10. The dimensions of the arcuate contact 64 and 66 are selected such that a suitable period of time, as for example, about forty seconds, ensues between the time wiper contact 60 engages the arcuate contacts 64 and 66, respectively. During this period of time, the variable resistance 20 is adjusted to position the voltmeter pointer at the desired point on the voltmeter dial.

The switch wiper contact 60 subsequently engages arcuate contact 66 to energize the winding 32 of the solenoid relay 34 with the result that the second load resistance 52 is connected across the battery 10. As in the case of the first described circuit, the consequent deflection of the voltmeter pointer 54 serves to indicate the presence or absence of a defective cell or cells in the battery under test. The synchronous or hydraulic mechanism operating the time switch 62 then rotates the wiper contact 60 around to its initial starting position to permit an additional test of the battery condition.

Thus, there has been shown and described a novel method and means for establishing the condition of a battery in which relatively simple equipment is required and which may be operated by relatively inexperienced personnel. These advantageous results have been attained in accordance with the invention by initially taking into account many of the variable factors that heretofore have served to unduly complicate the testing of batteries, such variable factors including differences in temperature, battery size, plate size, and the fully charged specific gravity of the electrolyte in the battery.

It will be understood by those skilled in the art that modifications may be made in the construction, arrangement of the parts, and in the sequence of the steps of the above-described, novel method and means for testing batteries without departing from the real spirit and purpose of this invention, and it is intended to cover by the appended claims any modified structure or use of equivalents which reasonably may be used within their scope.

What is claimed as the invention is:

1. The improvement in measuring and testing apparatus for providing a pair of comparison indications of the condition of a battery comprising the combination of a first circuit connected to the terminals of said battery, said first circuit including a variable resistance and an indicating meter having a pointer, a second circuit connected to the terminals of said battery, said second circuit including a first resistance load and a first switch having a pair of normally open contacts, said contacts when closed serving to connect said first load directly across said battery terminals to deflect said pointer to give a first indication of battery condition, means for varying said variable resisance to position said pointer to a predetermined setting after said first switch is closed, a third circuit connected to the terminals of said battery, said third circuit including a second switch having a pair of normally open contacts, and a solenoid winding adapted to be energized upon closing of said second switch, and a fourth circuit comprising the solenoid contacts and a second resistance load adapted to be connected directly across said battery terminals when said solenoid is energized to again deflect said pointer whereby the deflection of said pointer in response to the closing of the solenoid contacts is representative of the condition of said battery.

2. Measuring and testing apparatus for a pair of comparison indications to determine the condition of a battery comprising a pair of terminals adapted to be connected to the terminals of said battery, battery condition indicating means connected to said pair of terminals, first switch means for connecting a first load to said pair of terminals for obtaining a first indication on said indicating means, adjusting means connected to said indicating means for adjusting the latter to a predetermined setting after said first indication is obtained, and second switch means for connecting an additional load to said pair of terminals for obtaining a second indication, said second indication being representative of the condition of the battery, said first and second switch means comprising a first stationary contact member of longer length, a second stationary contact member of shorter length, and a wiper contact member positioned to sequentially engage said first stationary contact member and then each of said first and second stationary contact members to sequentially connect said first load and then said second load to said battery to provide a pair of comparison indications of the battery condition on said indicating means.

3. The method of testing a battery comprising the steps of connecting a variable resistance and a voltmeter having a pointer to the terminals of the battery, connecting a first load to the terminals of the battery to lower the battery voltage and thereby cause the meter pointer to deflect, adjusting said variable resistance to position the meter pointer at a predetermined setting, and connecting a second load across the battery terminals in parallel with said first load to further lower the battery voltage and thereby cause said pointer to be deflected from said predetermined setting an amount indicative of the condition of said battery.

4. The method of testing a battery comprising the steps of connecting a voltage indicator to the terminals of the battery, connecting a first load across the terminals of the battery to lower the battery voltage and cause said voltage indicater to indicate the lower voltage, adjusing said voltage indictaor pointer to a predetermined indication, and connecting a second load across the terminals of the battery in parallel with said first load to obtain an indication representative of the condition of said battery.

5. The method of testing a battery comprising the steps of connecting a voltage indicator to the terminals of the battery, making a first voltage reading under load during a first time interval, adjusting the voltage indicator to a predetermined indication, and making a second voltage reading under load at a subsequent time interval to provide a comparison indicative of the condition of the battery, such comparison being independent of battery variables, such as size, temperature, and the like.

References Cited in the file of this patent

UNITED STATES PATENTS

| | | |
|---|---|---|
| 2,295,578 | Heyer | Sept. 15, 1942 |
| 2,782,357 | Heyer et al. | Feb. 19, 1957 |